(12) United States Patent
Chen et al.

(10) Patent No.: US 7,369,405 B2
(45) Date of Patent: May 6, 2008

(54) COMPUTER ENCLOSURE WITH REMOVABLE BRACKET

(75) Inventors: Yun-Lung Chen, Tu-Cheng (TW);
Yu-Ming Xiao, Shenzhen (CN);
Xian-Huang Gao, Shenzhen (CN)

(73) Assignees: Hong Fu Jin Precision Industry (Shenzhen) Co., Ltd., Bao-an District, Shenzhen, Guangdong Province (CN);
Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 301 days.

(21) Appl. No.: 11/317,968

(22) Filed: Dec. 23, 2005

(65) Prior Publication Data

US 2007/0002532 A1    Jan. 4, 2007

(30) Foreign Application Priority Data

Jul. 2, 2005    (CN) .................. 2005 2 0061149 U

(51) Int. Cl.
*G06F 1/16*    (2006.01)

(52) U.S. Cl. ................... 361/687; 248/155.2; 267/293; 439/682; 165/104.33

(58) Field of Classification Search ............. 248/155.2, 248/435, 222.51; 267/293, 140.13; 292/1; 165/19, 104.33; 439/682, 689, 650; 16/258, 16/382; 361/679–687, 624–727
See application file for complete search history.

(56) References Cited

U.S. PATENT DOCUMENTS

| 5,566,156 | A  | * | 10/1996 | Choi ........................... 720/634 |
| 6,373,696 | B1 | * | 4/2002  | Bolognia et al. ........... 361/687 |
| 6,388,876 | B1 |   | 5/2002  | Chen ........................... 361/685 |
| 6,424,526 | B1 | * | 7/2002  | Heard ......................... 361/687 |
| 6,449,149 | B1 | * | 9/2002  | Ohashi et al. .............. 361/687 |
| 6,538,879 | B2 |   | 3/2003  | Jiang .......................... 361/683 |

* cited by examiner

*Primary Examiner*—Hung Van Duong
(74) *Attorney, Agent, or Firm*—Morris Manning Martin LLP; Tim Tingkang Xia, Esq.

(57) ABSTRACT

A computer enclosure includes a base (10), a securing member (30) and a bracket (50). A through hole (164, 184) is defined in the base. The securing member secured to base. A guiding groove (32) is defined in the securing member. The bracket is attached to the base, and has a latching tab (534, 544) and a post (536, 566). During engaging of the latching tab in the through hole of the base, the latching tab presses against an edge of the though hole. The bracket is thereby driven to slide forward on the base, with the post engaging in the guiding groove of the securing member. The bracket is thus secured to the base.

20 Claims, 5 Drawing Sheets

COMPUTER ENCLOSURE WITH REMOVABLE BRACKET

BACKGROUND OF THE INVENTION

1. Field of the Invention

The present invention relates to computer enclosures, and more particularly to a computer enclosure with a removable bracket for accommodating data storage devices such as hard disk drives, floppy disk drives, Compact Disk Read-Only Memory (CD-ROM) drives, etc.

2. General Background

Generally, a computer enclosure includes a bracket for accommodating data storage devices such as hard disk drives, floppy disk drives, CD-ROM drives, etc. The bracket is often secured to the computer enclosure with screws. However, this mounting means can be very inconvenient, laborious and time-consuming.

Another kind of computer enclosure includes a frame body, a first bracket, a second bracket, a slide structure, and a retaining device. The first and second brackets are used to accommodate the data storage devices. The first bracket is fixedly locked in the frame body. The second bracket is pivotally joined on the frame body. Through sliding of the slide structure, the second bracket can be turned over to facilitate assembly or disassembly for a computer maintenance technician. Contrarily, the second bracket can reach a predetermined position to let the second bracket be hooked on the first bracket through retaining of the retaining device, thereby achieving the object of positioning. However, this mounting means for securing the second bracket to the first bracket is rather complicated.

What is needed, therefore, is a computer enclosure having a bracket which is conveniently secured to the mounting enclosure with a simple mounting means.

SUMMARY

A computer enclosure includes a base, a securing member and a bracket. A through hole is defined in the base. The securing member is secured to base. A guiding groove is defined in the securing member. The bracket is attached to the base, and has a latching tab and a post. During engaging of the latching tab in the through hole of the base, the latching tab presses against an edge of the though hole. The bracket is thereby driven to slide forward on the base, with the post engaging in the guiding groove of the securing member. The bracket is thus secured to the base.

Other advantages and novel features will be drawn from the following detailed description of preferred embodiments with attached drawings, in which:

DETAILED DESCRIPTION OF PREFERRED EMBODIMENTS

Figure 1:
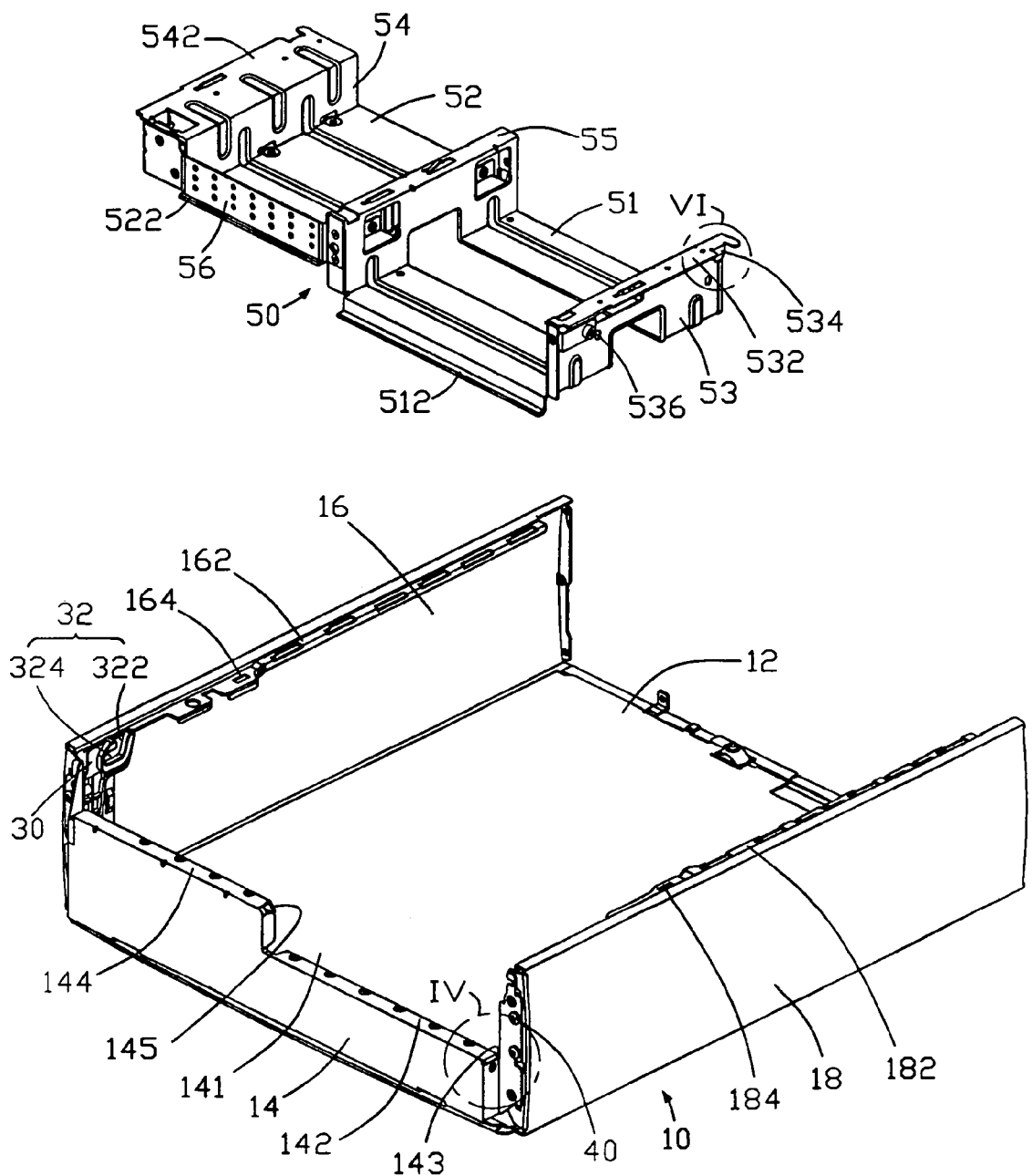
FIG. 1 is an exploded, isometric view of a computer enclosure of a preferred embodiment of the present invention, the computer enclosure including a base, a bracket and a pair of securing members.
Figure 2:
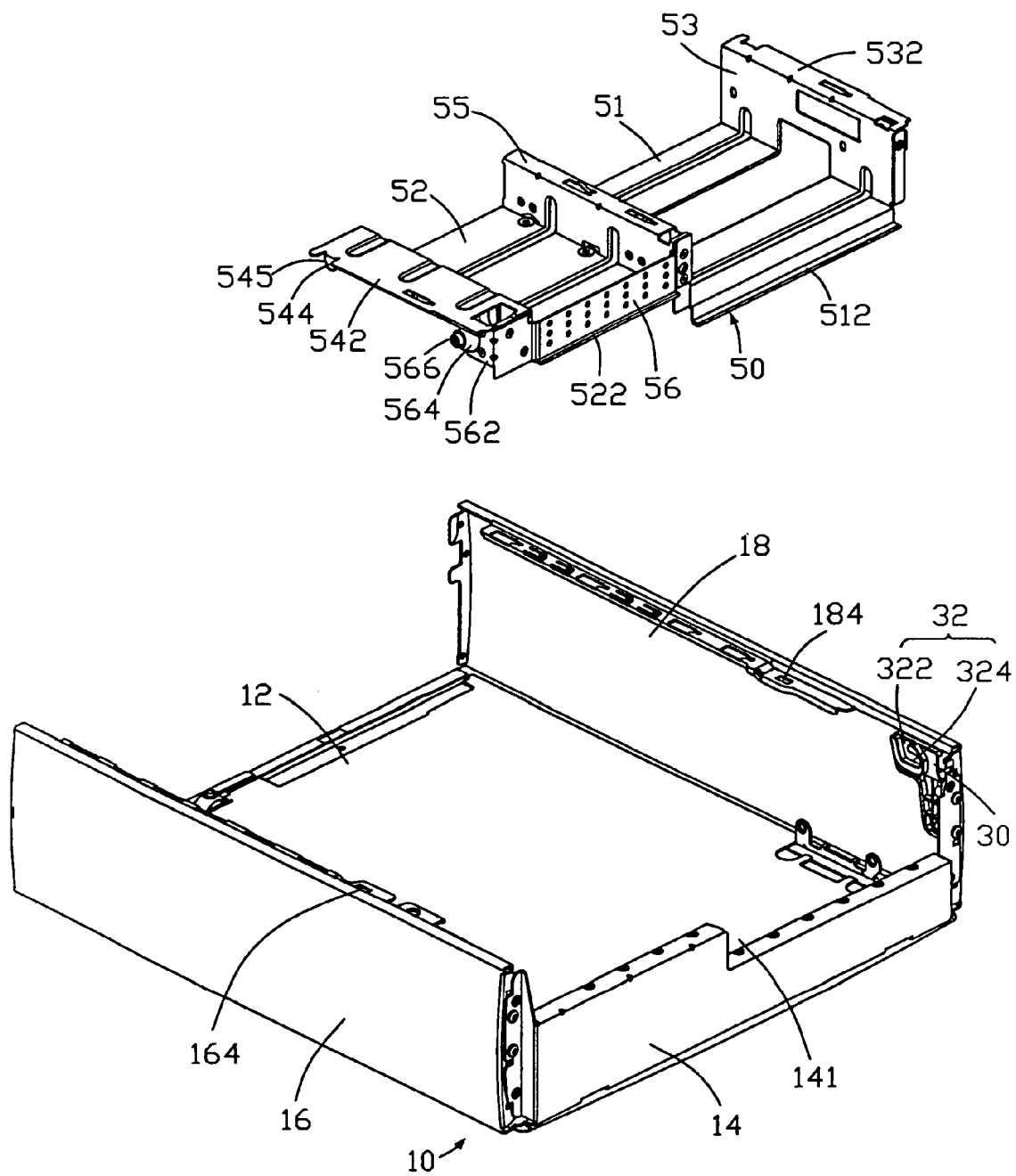
FIG. 2 is similar to FIG. 1, but viewed from another aspect.

Referring to FIGS. 1 and 2, an enclosure of an electronic device like a computer includes a base 10, and a pair of securing members 30 and a bracket 50 used to accommodate data storage devices. The data storage devices may, for example, be hard disk drives, floppy disk drives, CD-ROM drives, etc.

Figure 3:
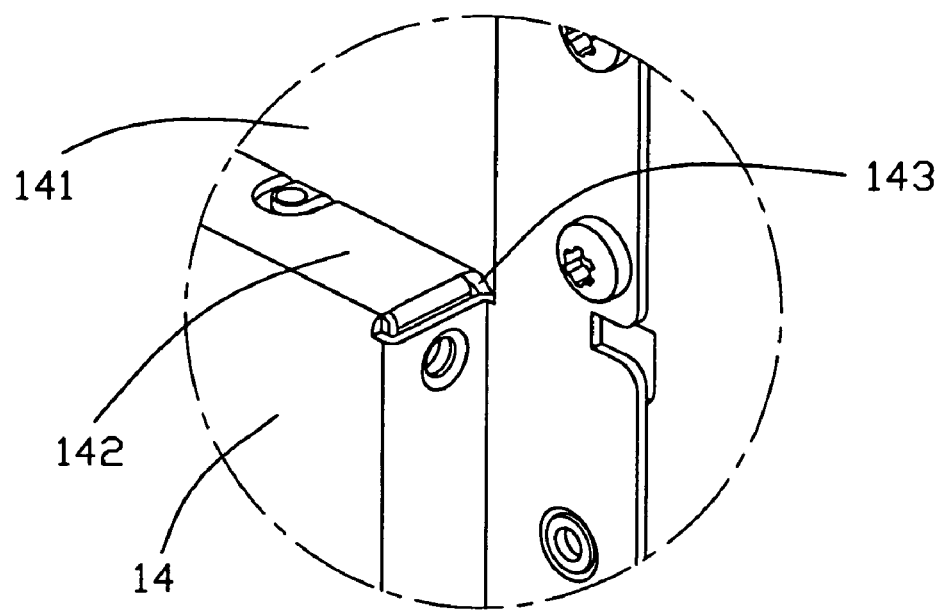
FIG. 3 is an enlarged view of a circled portion III of the base of FIG. 1.

The base 10 includes a bottom plate 12, a front plate 14, and a pair of side plates 16, 18. The front plate 14 and the side plates 16, 18 are perpendicularly bent from adjacent edges of the bottom plate 12 respectively. An opening 141 having a stepped edge is defined in the front plate 14 between the side plates 16, 18. Two rims 142, 144 are formed at the stepped edge of the opening 141. Two slanted blocking flanges 143, 145 extend inwardly and downwardly from the rims 142, 144 respectively, as best shown in FIG. 3. Each of the side plates 16, 18 has a support flange 162, 182. Two through holes 164, 184 are defined in the support flanges 162, 182 respectively.

The securing members 30 are fixed to the side plates 16, 18 respectively. Each securing member 30 defines a generally L-shaped guiding groove 32. The guiding groove 32 includes an entry 322 and a chamber 324.

Figure 4:
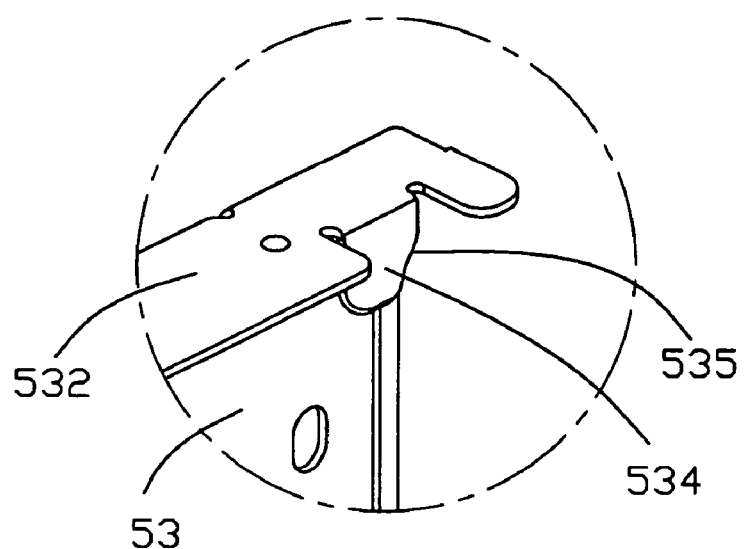
FIG. 4 is an enlarged view of a circled portion IV of the bracket of FIG. 1.

The bracket 50 includes two bottom walls 51, 52, and a pair of side walls 53, 54. A projecting portion 55 is formed on the bracket 50 to connect with the bottom walls 51, 52. Two slanted pressing flanges 512, 522 extend horizontally and outwardly from the bottom walls 51, 52 respectively, corresponding to the blocking flanges 143, 145 of the base 10. Two retaining plates 532, 542 extend outwardly from the side walls 53, 54. Two latching tabs 534, 544 are bent downwardly from rear portions of the retaining plates 532, 544 respectively, corresponding to the through holes 164, 184 of the base 10. Each of the latching tabs 534, 544 has a slanted edge or an arc-shaped edge 535, 545 at a rear end, as shown in FIGS. 2 and 4. A post 536 is disposed on the side wall 53 at a front portion thereof, corresponding to the guiding groove 32 of the securing member 30 on the side plate 18. A cover plate 56 is fixed to the bracket 50 in front of the bottom wall 52. A positioning clip 562 is bent inwardly from the cover plate 56. A convex portion 564 is formed on the positioning clip 562. A post 566 is disposed on the convex portion 564, corresponding to the guiding groove 32 of the securing member 30 on the side plate 16.

Figure 5:
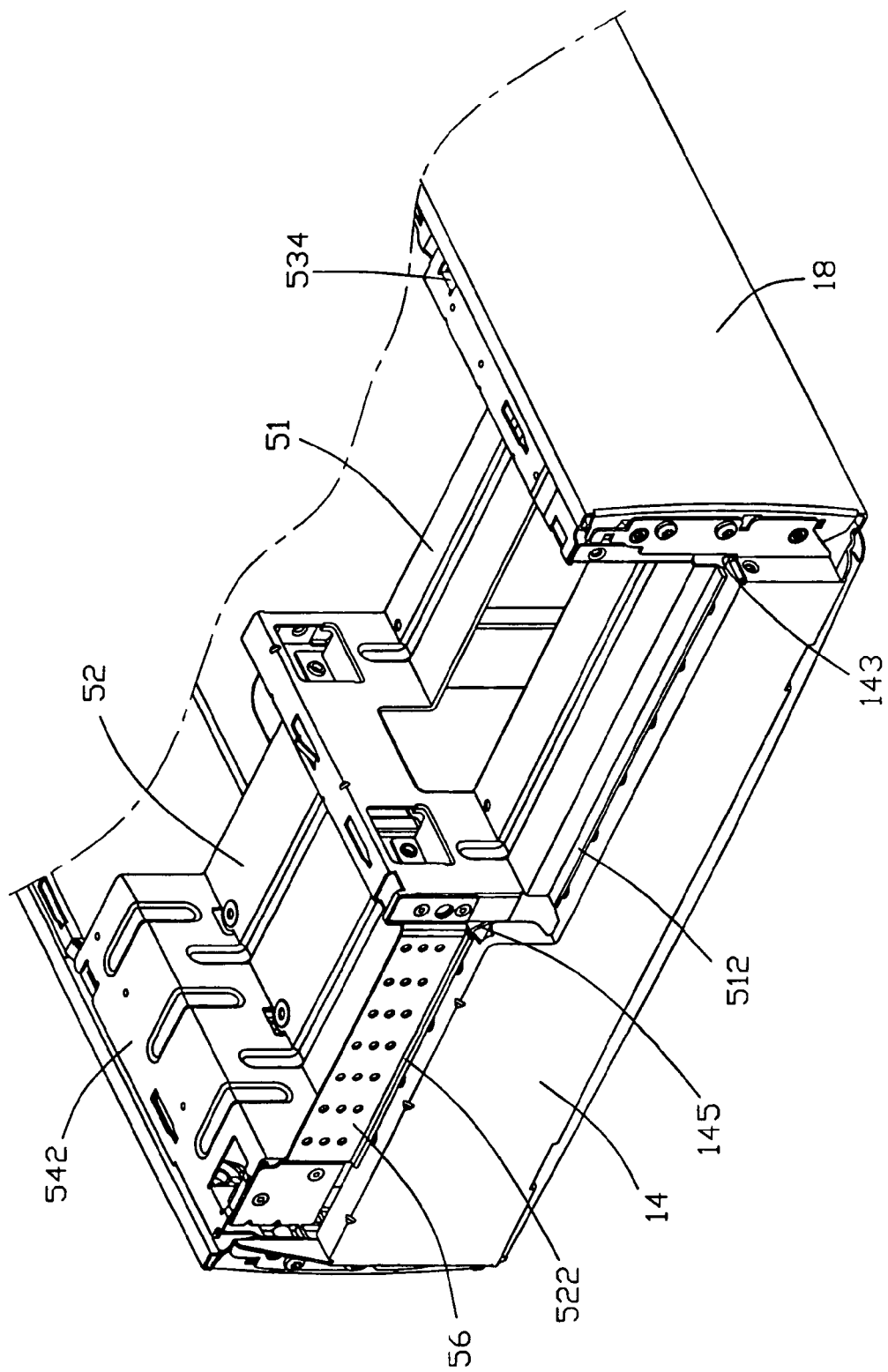
FIG. 5 is an assembled view of the computer enclosure of FIG. 1, but only showing a front portion of the base.
Figure 6:
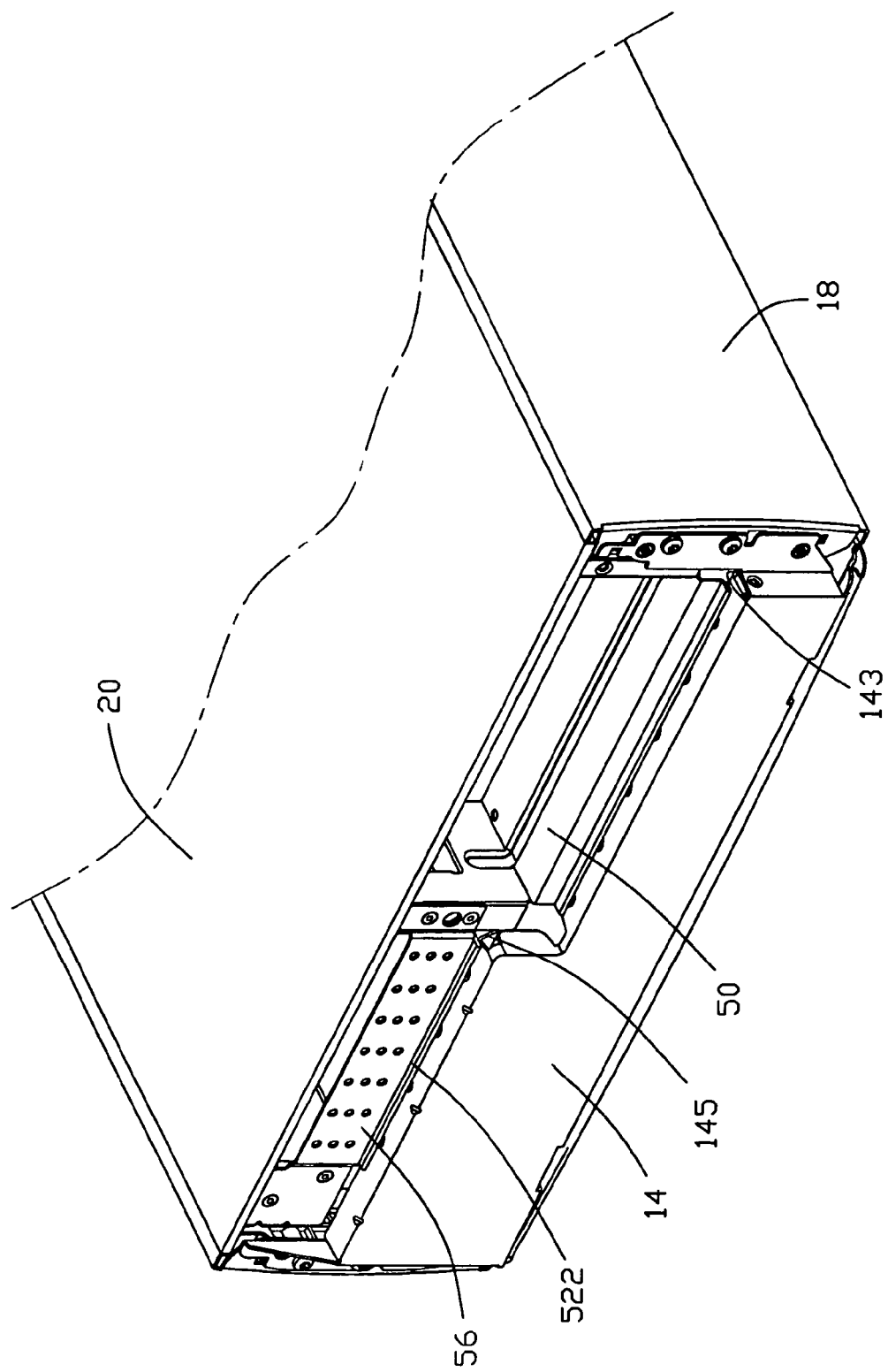
FIG. 6 is similar to FIG. 5, but showing a cover secured to the base.

Referring also to FIG. 5, the bracket 50 is lowered onto the base 10. The pressing flanges 512, 522 are located inside the base 10 and adjacent to the blocking flanges 143, 145. The posts 536, 566 slide into the corresponding entries 322 of the guiding grooves 32 of the securing member 30. The edges 535, 545 of the latching tabs 534, 544 abut against edges of the corresponding through holes 164, 184 of the side plates 16, 18. The bracket 50 is then pressed downwardly. The latching tabs 534, 544 are inserted into the through holes 164, 184, and the edges 535, 545 slide along the edges of the through holes 164, 184 respectively at the same time, thereby pushing the bracket 50 moving outwardly on the support flanges 162, 182 of the base 10. When the pressing flanges 512, 522 of the bracket 50 abut against the blocking flanges 143, 145 of the base 10 respectively, the bracket 50 is further pressed down to have the pressing flanges 512, 522 sliding across blocking flanges 143, 145 and engaging with the rims 142, 144. The posts 536, 566 are positioned into the chambers 324 of the securing members 30 respectively. The bracket 50 is thus installed to the base 10. A cover 20 can be secured to the base 10 to cover the bracket 50, as shown in FIG. 6.

In disassembling the bracket 50, the cover 20 is removed from the base 10. A rear portion of the bracket 50 is pushed upwardly. The latching tabs 534, 544 disengage from the through holes 164, 184. The pressing flanges 512, 522 of the bracket 50 are urged to pass across the rims 142, 144 of the base 10, and abut against the blocking flanges 143, 145. The pressing flanges 512, 522 are then pushed by the blocking flanges 143, 145, thereby driving the bracket 50 to slide inwardly. The posts 536, 566 slide inwardly to the entries 322 of the securing members 30. Thus the bracket 50 can be taken away from the base 10.

In the preferred embodiment, the pressing flanges 512, 522 of the bracket 50 can also be slanted flanges, extending outwardly and upwardly from the bottom walls 51, 52 of bracket 50 respectively.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. A computer enclosure comprising:
a base defining a through hole therein;
a securing member secured to the base and defining a guiding groove; and
a bracket attached to the base, the bracket having a latching tab and a post, wherein during engaging of the latching tab in the through hole of the base, the latching tab presses against an edge of the through hole, thereby driving the bracket to slide on the base and the post to engage in the guiding groove of the securing member, whereby the bracket is secured to the base.

2. The computer enclosure as described in claim 1, wherein the latching tab of the bracket has a slanted edge.

3. The computer enclosure as described in claim 1, wherein the latching tab of the bracket has an arc-shaped edge.

4. The computer enclosure as described in claim 1, wherein the guiding groove comprises an entry and a chamber for accommodating the post of the bracket.

5. The computer enclosure as described in claim 1, wherein a blocking flange is disposed on the base, and a pressing flange is disposed on the bracket for moving along the blocking flange to disengage the bracket from the base.

6. The computer enclosure as described in claim 5, wherein the blocking flange of the base slants inwardly and downwardly.

7. The computer enclosure as described in claim 6, wherein the base comprises a front plate defining an opening, the opening corresponding to the bracket.

8. The computer enclosure as described in claim 7, wherein the blocking flange of the base is disposed at an edge of the opening.

9. The computer enclosure as described in claim 5, wherein the pressing flange of the bracket slants horizontally and outwardly.

10. A computer enclosure comprising:
a base having a slanted blocking flange, and defining a guiding groove therein; and
a bracket attached to the base, the bracket having a pressing flange abutting against the blocking flange and a post engaging into the guiding groove, wherein when the bracket is pushed, the pressing flange moves along the blocking flange thereby driving the bracket to slide on the base, whereby once the post has disengaged from the guiding groove of the base, the bracket can be taken away from the base.

11. The computer enclosure as described in claim 10, wherein the guiding groove comprises an entry and a chamber for accommodating the post of the bracket.

12. The computer enclosure as described in claim 10, wherein the pressing flange of the bracket slants outwardly and upwardly.

13. The computer enclosure as described in claim 10, wherein the blocking flange of the base slants inwardly and downwardly.

14. The computer enclosure as described in claim 10, wherein the base comprises a front plate defining an opening, the opening corresponding to the bracket, and the blocking flange is disposed at an edge of the opening.

15. The computer enclosure as described in claim 10, wherein the base defines a through hole, and a latching tab is disposed on the bracket for engaging in the through hole, whereby the bracket can slide to an engaged position relative to the base.

16. The computer enclosure as described in claim 15, wherein the latching tab of the bracket has a slanted edge.

17. The computer enclosure as described in claim 15, wherein the latching tab of the bracket has an arc-shaped edge.

18. An electronic device comprising:
a base of said electronic device defining a first space therein, a side of said base defining an opening thereat; and
a bracket defining a second space therein for accommodating components of said electronic device and removably attachable to said base so as to be placed in said first space of said base and have said second receiving space spatially communicable with said opening at said side of said base, said bracket being movable in said first space between a first position thereof where said bracket partially enters said first space and is free for further movement thereof, and a second position thereof where said bracket entirely enters said first receiving space to abut against said side of said base and is secured to said base, abuttal of said bracket in said second position thereof against said side of said base capable of urging said bracket to move from said second position thereof to said first position thereof when said bracket is released in said second position thereof.

19. The electronic device as described in claim 18, wherein movement of said bracket between said first and second position thereof is controllably guidable by engagement of a post formed on said bracket and a guiding groove form on said base.

20. The electronic device as described in claim 18, wherein said abuttal of said bracket against said side of said base is performed by pressing flanges extending out of said bracket.

* * * * *